United States Patent [19]

Winter

[11] Patent Number: 4,460,466

[45] Date of Patent: Jul. 17, 1984

[54] ADSORPTION FILTER WITH DESORPTION DEVICE

[75] Inventor: Karl Winter, Dortmund, Fed. Rep. of Germany

[73] Assignee: CEAG Verfahrenstechnik GmbH, Bork, Fed. Rep. of Germany

[21] Appl. No.: 426,822

[22] Filed: Sep. 29, 1982

[30] Foreign Application Priority Data

Oct. 3, 1981 [DE] Fed. Rep. of Germany ....... 3139369

[51] Int. Cl.$^3$ .................... B01D 15/00; B01D 53/04
[52] U.S. Cl. ................................ 210/274; 55/208; 55/387; 55/389
[58] Field of Search .................... 55/29–31, 55/33, 35, 59, 62, 74, 75, 80, 196, 222, 267, 387, 389, 208; 210/673, 677, 269, 274

[56] References Cited

U.S. PATENT DOCUMENTS 3,494,102  2/1970  Dunn ........................................ 55/62
4,030,896  6/1977  Wimber et al. ........................... 55/62

FOREIGN PATENT DOCUMENTS 2942959  10/1979  Fed. Rep. of Germany .

Primary Examiner—Ivars C. Cintins
Attorney, Agent, or Firm—Herbert L. Lerner; Laurence A. Greenberg

[57] ABSTRACT

The recovery of water-free desorbates from adsorption filters hampered not only by desorption with water vapor but also by water which is adsorbed at the adsorption media from the gas or the air to be purified and which water is likewise driven out during the desorption. It has now been found that desorbate without water can be recovered if the gaseous desorption medium is pre-dried in a water sorption filter with an adsorption medium having water-selective action, before entering the condenser-cooler. Bypasses avoiding the sorption water reservoir as well as the condenser-cooler also permit operating conditions which go beyond the normal desorption, namely, desorption with increased temperature for driving out less volatile residual loads as well as reactivating desorption. In a particular embodiment, the sorption heat accumulator can be combined with the condenser-cooler, an embodiment which can be employed particularly for recovery equipments.

14 Claims, 2 Drawing Figures

ADSORPTION FILTER WITH DESORPTION DEVICE

BACKGROUND OF THE INVENTION

1. Field of the Invention

The invention relates to an adsorption filter with a gas inlet and a gas outlet as well as with a desorption device for regenerating the loaded adsorption filter and for recovering the desorbate by condensation. The desorption device has a circulating blower which transports a substantially inert gaseous desorption medium in a closed loop, a heat exchanger which precedes the adsorption filter in the desorption direction, a condenser following the adsorption filter in the desorption direction, and piping connecting these components to the adsorption filter to form an equipment loop. The gas inlet lines and the gas outlet lines as well as the piping of the desorption device are equipped near the adsorption filter with dampers to shut off the raw gas inlet lines and the purified gas outlet lines of the adsorption filter during the desorption while leaving the piping of the desorption loop open.

2. Description of the Prior Art

German Published Non-Prosecuted Application DE-OS No. 29 42 959 is directed to a method for the recovery of substances adsorbed on activated carbon without water. The specific goal is the recovery of waterfree solvents. This method provides that the desorbed solvents are freed of water vapor by adsorptive drying prior to condensation. In addition, it teaches the use of zeolithic molecular sieves. However, information for designing the device for implementing the method is not given.

SUMMARY OF THE INVENTION

An object of the invention is to provide apparatus for the advantageous implementation of the method of recovery of adsorbed substances without water. In particular, the use of the apparatus will permit the adsorptive drier to be kept within the range of its operating temperature even after the heat transfer front has penetrated, without the need for elaborate control systems. A further object to provide apparatus which will compactly and effectively recover waterfree desorbates. In addition, an object of the invention is to provide a desorption device that can be produced economically and operated safely.

With the foregoing and other objects in view, there is provided in accordance with the invention an adsorption filter for purifying feed gases and liquids by removing impurities therefrom and a desorption device for regenerating the adsorption filter charged with adsorbed impurities and for recovering the desorbate comprising a vessel containing a body of adsorption material, a feed inlet in the vessel for the introduction of the feed containing impurities for passage through the body of adsorption material for the removal of impurities therefrom, a purified feed outlet in the vessel for the discharge of feed from which the impurities have been removed, feed damper means for blocking the flow of feed into the vessel and purified feed damper means for blocking the flow of purified feed from the vessel, the combination therewith of a blower for circulating in a closed loop a substantially inert gaseous desorption medium into the vessel and through the body of adsorption material to desorb the same, a heat exchanger in the loop preceding the adsorption filter in the desorption direction, said inert gaseous desorption medium passing in indirect heat exchange with a heating medium in the heat exchanger, a condenser in the loop following the adsorption filter in the desorption direction wherein the inert gaseous desorption medium containing desorbate is cooled and the desorbate condensed, inert gas inlet damper means and inert gas outlet damper means in the loop near the vessel which can be opened to permit the circulation of inert gas during the desorption, and a sorption water and reservoir in the loop between the adsorption filter and the condenser, said sorption water and reservoir containing a packed bed of water-selective adsorptive material and a regenerative heat exchanger with a heat accumulator mass preceding this packed bed.

Other features which are considered as characteristic for the invention are set forth in the appended claims.

Although the invention is illustrated and described herein as embodied in an adsorption filter with desorption device, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
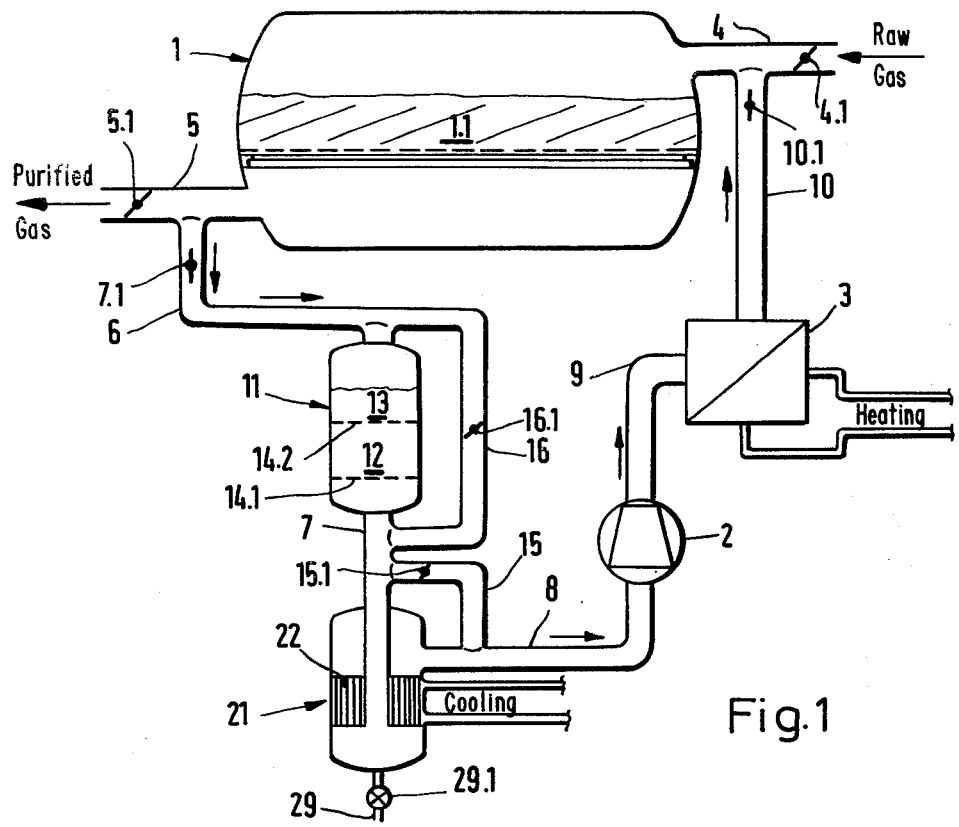
FIG. 1 diagrammatically illustrates the apparatus in accordance with the invention, showing an adsorption filter with impure gas inlet and purified gas outlet as well as dampers for blocking them off, a desorption device in which a blower circulates an inert gas in a closed circuit to desorb the filter, first heating the inert gas in a heat exchanger prior to entry in the filter. The inert gas containing desorbate in the circuit passes through a sorption water reservoir containing a regenerative heat accumulator and a water-selective adsorptive material which removes the water. The inert gas and water-free desorbate then pass to the condenser where the desorbate is separated by condensation. The separated inert gas is then recirculated by the blower to the filter.

According to the invention, a sorption water reservoir with a bed of water-selective adsorption material and a regenerative heat exchanger preceding this bed is provided in the line of the desorption loop between the adsorption filter and the condenser. This arrangement ensures that water vapor once driven out during the desorption is taken up by the adsorption material which adsorbs water vapor selectively. The gaseous desorption medium with the driven-out desorbate is fed to the condenser with so low a dew point that practically only water-free desorbate is condensed in the cooler. The preceding heat accumulator keeps the temperature constant. This is important because the heat transfer zone in the adsorption filter generally travels somewhat faster than the desorption front and a temperature rise of the gaseous desorption medium can be expected before the desorption process is completed. At that point, however, the regenerative heat accumulator is still cold. The heat of the desorption medium can therefore have no adverse effect on the adsorptivity of the following water-selective adsorption material in the sorption water accumulator (or reservoir).

The bed of water-selective adsorption material may consist of granular silicon dioxide gel. In addition, the bed may be water-selective adsorption material of granular zeolithic molecular sieves. Also, the bed may be water-selective adsorption material of granular aluminum oxide gel. These three substances are typical water-selective adsorption materials which are particularly suitable for this application since they do not react, contrary to other drying agents, with organic desorbates, especially with driven-out solvents which are usually organic in nature, and adsorb these desorbates to a far lesser degree than water. In addition, these three drying agents are granular and retain the granular structure even when saturated with water. Finally, they can be regenerated in a simple manner, merely by raising the temperature.

The heat storage material of the regenerative heat accumulator may be employed as a packed bed. Contrary to the recuperative heat accumulators, regenerative heat accumulators require a storage mass. This storage mass can be put in place in the form of a lattice but may also be utilized, as proposed here, as a packed bed. A substantial advantage of the use of a packed bed is that the regenerative heat accumulator can be produced simply and economically.

The packed bed of the regenerative heat accumulator may be placed on a screen sheet which lies directly on the protective layer of the water-selective adsorption material. By this kind of arrangement, a space-saving design is obtained, in that the screen sheet effectively prevents the massive parts of the packed heat storage material from sinking in. Also, a rock bed, preferably a quartz gravel bed with a 5/10 mm grain size may be provided as the heat storage material. Gravel and ballast beds have been found suitable as simple heat storage material. In selecting the material, the mass and the specific heat are important. Basalt and granite gravel have been found to be advantageous materials; however, quartz gravel beds with a quartz gravel grain size of 5/10 mm turned out to be particularly advantageous.

Desirably, the mass of the heat storage material is about 0.5- to 3-times and, preferably, twice the mass of the water-selective adsorption material, and the packed bed arranged in the water reservoir of water-selective adsorption material preferably has a volume of about 15% to 35% and, desirably, about 25% of the packed bed of adsorption material present in the adsorption filter. The mass and volume limitations according to this proposal are based on the insights that the entire amount of water adsorptively stored in the adsorption medium of the adsorption filter must be taken up by the water reservoir (accumulator) and that the heat transfer front travels faster and more steeply through the adsorption filter than the desorption front. The heat transported by the gaseous desorption medium before the end of the desorption is taken up with the proposed mass ratio by the heat storage mass without substantial excess capacity still being available. This is important because after the end of the desorption of the adsorption medium in the adsorption filter, the sorption heat accumulator is to be desorbed with the thermal energy present in the gaseous desorption medium, and the water released in the process is to be transported back into the cooled-down adsorption material of the adsorption filter. To this end, the heat supply via the heat exchanger is switched off before the end of the desorption and the desorption is continued with the residual heat from the adsorption medium in the adsorption filter. The desorbed layers then cool down and are ready, when the temperature front has traversed the heat storage mass of the sorption water reservoir, to reaccept the water driven out of the water reservoir.

A bypass is provided which shunts the condenser and contains a damper closing the bypass. This permits bypass of the condenser during the expulsion phase of the water from the sorption water reservoir, and thereby effectively prevents condensation of the water. This is of interest particularly if activated carbon is used as the adsorption medium in the adsorption filter, which carbon was desorbed at such high temperature than its water content is negligible. With activated carbon dried to this extent, there is the danger of spontaneous ignition if the adsorption filter is switched to adsorption again and if residual heat is still present locally in the packed bed, in addition to which heat is released by the exothermic adsorption process. The temperature rise occurring thereby may locally exceed the ignition temperature in the case of extremely dry carbon and cause the carbon to be ignited. This danger of combustion is counteracted by the return of the water which is thus not condensed in the condenser.

A bypass which shunts the sorption water reservoir and contains a damper closing the bypass is provided. Thereby the water reservoir can be bypassed if the desorption of the water from the activated carbon of the adsorption filter is completed before the desorption of the solvents. After the desorption of the solvents is completed as indicated by the lack of further condensate accumulation, the sorption water reservoir can be reinserted into the circulation of the gaseous desorption medium by opening the damper, so that the water stored therein is driven out and taken back to the activated carbon in the adsorption filter.

In a special embodiment, the sorption water reservoir with the packed bed of the heat accumulator and the packed bed of the water-selective adsorption material is arranged in the condenser housing. This arrangement results in a particularly space-saving compact design which permits the use of the device in compact recovery plants.

The cooler of the condenser is designed in the form of a ring with vertically arranged cooling surfaces. The cooler is provided with a central inflow; and a ring plate which can be lifted and covers the outflow side of the cooler with a central nozzle engaging the inflow is provided which, in the lifted condition cooperates with an upper ring flange and in the lowered condition with a lower ring flange, forming a seal. Through this embodiment it is possible to dry the gaseous desorption medium loaded with desorbate and water in the condenser and to intercept in the process a breakthrough of the temperature front which may occur toward the end of the desorption phase. However, it is also possible to prevent the condensation of the water which is driven out of the sorption water reservoir after the end of the desorption of the adsorption filter, in the condenser by lowering the ring plate to close the output opening of the cooler and release the outflow opening of the desorption loop for the gaseous desorption medium carrying the driven-out water. Slight condensation by diffusion through the central nozzle is negligible in this connection.

The nature of the invention will be explained in greater detail with reference to FIGS. 1 and 2.

FIG. 1 shows an adsorption filter 1 as a horizontal vessel with a packed bed 1.1 of an adsorption medium container therein, which is placed on a grate, not specifically designated. The raw gas to be purified is fed to the adsorption filter via line 4, which can be closed by means of the damper 4.1. The gas purified in the adsorption filter 1 flows out through the line 5 which likewise contains a damper 5.1. The dampers 4.1 and 5.1 are closed in the operating position "Desorption" shown. It goes without saying that these dampers are subject to increased tightness requirements and that they may be designated under some circumstances as double flaps with a space in between which is kept at a protective-gas overpressure.

The adsorption filter 1 is connected to the desorption equipment which is constructed substantially of the blower 2 for circulating the gaseous desorption means, a heat exchanger 3 for heating the gaseous desorption medium, as well as a cooler 21 which is designed as a condenser for the desorbate to be recovered and which is preceded by a sorption water reservoir 11. This equipment is connected to the adsorption filter by the piping 6, 7, 8, 9 and 10. It is immaterial whether these pipe lines open into, i.e. are connected directly to the gas feed line 4 or the gas discharge line 5, or both, or are connected directly to the vessel of the adsorption filter 1. Dampers 7.1 and 10.1 are arranged in the lines 6 and 10 next to the adsorption filter 1. These dampers are open in the operating position "Desorption" and permit the passage of the gaseous desorption medium.

The cooler 21 contains a cooling surface stack 22, through which the desorption medium loaded with desorbate flows. The condensed desorbate precipitates at the advantageously vertically disposed cooling surfaces of stack 22. This condensed desorbate drips into the lower space of the cooler 21 and can be drained off through line 29, which can be shut off by means of faucet 29.1. Cooling is accomplished by a coolant which is brought-in from the outside and which is supplied by a refrigeration unit but may also be a refrigerant which is conducted in a heat pump loop and is evaporated in the cooler. A particularly space-saving design of the cooler is obtained if the line 7 is introduced concentrically with the cooler 21 designed as a condenser and passes through the cooling fin packet concentrically. This cooling surface packet is advantageously designed in this arrangement as a tube bundle cooler, where the coolant flows through the space between the tubes. In another design the cooling packet is a tubular surface cooler, in which mutually concentric tube sections form the cooling surfaces to which the pipes are connected which are aligned approximately along generatrix lines and carry the coolant, in a thermally conducting manner. Other cooling arrangements may also be utilized.

The cooler 21 designed as a condenser is preceded by the sorption water reservoir 11, both units of equipment being connected to each other by the line 7. The sorption water reservoir 11 contains an adsorption medium layer 12 with an adsorption medium which adsorbs preferentially the heavily polar water. Such selective adsorption means are, for instance, silica gel, zeolithic molecular sieves or granulated aluminum oxide gel. This adsorption medium layer which has water-selective action is placed on a grate 14.1 and is covered by a second grate 14.2. Both grates consist preferably of perforated sheet metal, and with the lower perforated metal sheet covered with a wire screen, the mesh width of which is smaller than the grain size of the water-selective adsorption medium 12. On the upper grate is arranged a regenerative heat accumulator 13, for which grid-shaped superstructures are possible. Since the flow resistance of the packed bed should not be too high, it is advantageous to keep the grain size of the heat storage material in the range of 5/10 mm. The heat storage is determined by the mass of the heat storage material charged-in and its specific heat. In addition to these properties of the heat accumulator 13, the material should not be influenced by high temperature nor attacked by the desorption medium or the desorbate. These properties are met, in the simplest manner, by non-porous rock, for instance, by suitably comminuted gravel of granite or basalt. Quartz gravel has been found particularly advantageous. While the quartz gravel does not allow packing as dense as is possible with crushed ballast because of its form, it does ensure a low flow resistance due to its smooth surfaces in conjunction with its "pore volume".

A bypass 15 is arranged in shunt with the sorption water reservoir 11, making a connection from the line 7 to the line 8 and allowing the cooler 21 designed as a condenser to be bypassed. This bypass can be shut off by means of a damper 15.1. As long as desorption is in operation and as long as desorbate is produced, the gaseous desorption medium is conducted through the cooler 21 for condensing the desorbate. After the desorption of the desorption medium in the adsorption filter 1 is finished, however, desorbate no longer accumulates; rather, the desorption of the sorption water reservoir 11 begins subsequently thereto. In order to prevent condensation of the water vapor driven out in the process in the condenser 21, it is advisable to open the damper 15.1 in this operating condition and thus to release the flow directly from the sorption water reservoir 11 to the circulating blower 2. It is also possible, of course, to place the damper 15.1 into the branch of the lines 7 and 15 in such manner that direct switching-over takes place and the damper 15.1 then shuts off line 7 leading to the condenser side.

Likewise, a bypass 16 which can be opened or shut off by means of the damper 16.1, is provided for bypassing the sorption heat accumulator 13. This bypass is of importance if the water stored in the adsorption medium 1.1 of the adsorption filter 1 is driven out completely before the desorption has ended, i.e., the partial water vapor pressure declines steeply. In this case the water-selective adsorption material 12 in the sorption water reservoir 11, loaded with water, can give off water vapor due to the low external partial water vapor pressure alone, which then would be condensed in the condenser 21 undesirably together with the desorbate. This can be avoided by opening the damper 16.1 which opens the bypass 16. It goes without saying that here also, the damper 16.1 can be designed as a switching-over flap, for instance, at the entrance of the line 6 into the sorption water reservoir 11 such that either the entrance into the sorption water reservoir 11 is unblocked if line 6 is shut off, or that line 16 is unblocked with direct flow to cooler 21.

Figure 2:
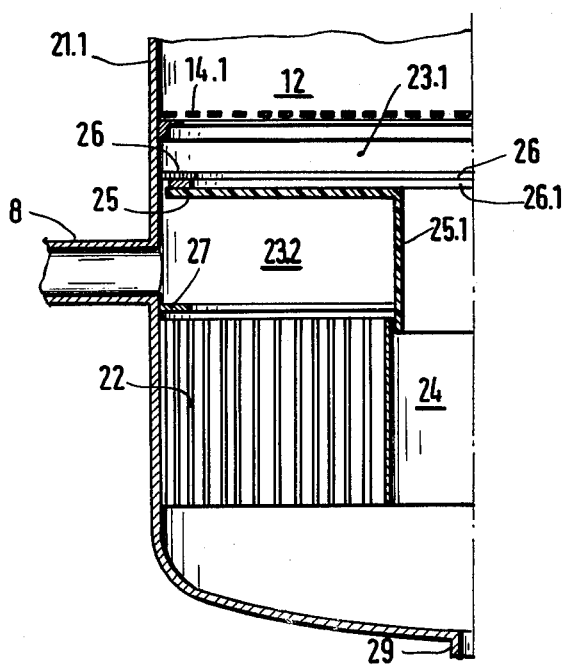
FIG. 2 illustrates as a cross section the lower end of a combination condenser and sorption water reservoir in one housing. A ring plate in the housing which can be raised or lowered is the means for preventing the flow of inert gas and desorbate through the cooling section of the condenser.

FIG. 2 shows a particular embodiment, in which the sorption water reservoir and the condenser are accommodated in a housing 21.1. The common housing 21.1 contains the cylinder-ring-shaped cooler, designed as a condenser 22, with a central inflow 24. The condensate running off the cooling surfaces is collected in the lower part of cooler 21 and can be drained through the connection piece 29. The connection 8, finally, leads on to the circulating blower 2. In the upper part of the housing 21.1, the regenerative heat exchanger, not shown, is provided; below it is arranged the adsorption medium layer 12 with water-selective action which lies on the grate 14.1. The gaseous desorption medium which flows through the packed-bed layers is collected underneath the grate 14.1 in a gas collecting space 23.1 which is provided with an overflow stub 25.1 pointing downward through a ring plate or washer 25 into the inflow stub 24. This washer 25 can be lifted; in the condition shown it rests against an upper flange ring 26 with an intermediate plate 26.1, making a seal. The gaseous desorption medium with the desorbate then flows from the gas collecting space 23.1 directly into the inflow stub 24 and from there upwardly through the cooler 22 designed as a condenser into a second gas collecting space 23.2 which is in the shape of a cylinder ring and is in direct connection with the line 8. With the washer 25 lowered, which in this condition rests against the ring flange 27, making a seal, a direct connection is formed between the gas collecting space 23.1 and the discharge stub 8; thereby, the effect of the bypass 15 is obtained without an additional pipe line. The stub 25.1 can then be made sufficiently long to extend almost to the inside wall of the bottom of the vessel 21.1. If an undrained residue of condensed desorbate stands in the bottom of vessel 21.1, an immersion seal is thus formed which ensures the effect of this bypass. External pipeline may be provided for the bypass 16 to avoid the water sorption reservoir part 11. The pipeline leads from the inflow from pipe 6 through piping 16 into the combined sorption water reservoir/condenser-cooler to the gas collecting space 23.1 and is brought there through the outer wall of the vessel 21.1.

The device in accordance with the invention makes it possible to recover a desorbate without water. In addition, it has surprisingly been found that hydrolysis of water-sensitive organic esters such as acetic acid esters also cannot be observed if this device is used: the recovered desorbate is practically free of acetic acid. The recovered desorbate can be re-used without additional expense. A shift of the composition toward more readily boiling components, for instance, for the reason that higher-boiling components remain as residual loading in the adsorption medium of the adsorption filter, can be avoided by increasing the desorption temperature. If higher-boiling components are expected, it may therefore be advisable to provide an additional heat exchanger in the line 10 which heats the gaseous desorption medium to a higher termperature during the final stage of the desorption process. In this manner, a reactivating desorption can also be carried out. In the desorption carried out up to higher temperatures, a further advantage of the bypass avoiding the water sorption reservoir manifests itself: In these cases, a temperature breakthrough can be expected, i.e. the temperature front has traversed the adsorption medium bed in the adsorption filter 1 before the desorption is completed. The temperature rise of the gaseous desorption medium leaving the adsorption filter could drive out water in an operating phase in which this is not yet desired; this becomes effective through bypassing the sorption water reservoir. What has been said above also applies to the reactivating desorption. It is further added here that the condenser-cooler must also be protected against an excessive temperature rise. Here, it is the bypass 15 and the lowered plate 25 which interrupt the flow through the cooler packet, respectively, which protects the condenser-cooler against undesired temperature rises.

I claim:

1. An adsorption filter for purifying feed gases and liquids by removing impurities therefrom and a desorption device for regenerating the adsorption filter charged with adsorbed impurities and for recovering the desorbate comprising a vessel containing a body of adsorption material, a feed inlet in the vessel for the introduction of the feed containing impurities for passage through the body of adsorption material for the removal of impurities therefrom, a purified feed outlet in the vessel for the discharge of feed from which the impurities have been removed, feed damper means for blocking the flow of feed into the vessel and purified feed damper means for blocking the flow of purified feed from the vessel, the combination therewith of a blower for circulating in a closed loop with a loop inlet and a loop outlet a substantially inert gaseous desorption medium through the loop inlet into the vessel and through the body of adsorption material to desorb the same, a heat exchanger in the loop preceding the loop inlet into the adsorption filter, said inert gaseous desorption medium passing in indirect heat exchange with a heating medium in the heat exchanger, a condenser in the loop between the loop outlet of the adsorption filter and the heat exchanger wherein the inert gaseous desorption medium containing desorbate is cooled and the desorbate condensed, inert gas inlet damper means and inert gas outlet damper means in the loop near the vessel which can be opened to permit the circulation of inert gas during the desorption, and a sorption water reservoir in the loop between the adsorption filter and the condenser, said sorption water reservoir containing a packed bed of water-selective adsorptive material and a regenerative heat exchanger with a heat accumulator mass preceding this packed bed.

2. Adsorption filter and desorption device according to claim 1, wherein the water-selective adsorption material of the packed bed is granulated silicon dioxide gel.

3. Adsorption filter and desorption device according to claim 1, wherein the water-selective adsorption material of the packed bed are granulated zeolithic molecular sieves.

4. Adsorption filter and desorption device according to claim 1, wherein the water-selective adsorption material of the packed bed is granulated aluminum oxide gel.

5. Adsorption filter and desorption device according to claim 1, wherein the heat accumulator mass of the regenerative heat accumulator is a packed bed.

6. Adsorption filter and desorption device according to claim 5, wherein the packed bed of the regenerative heat accumulator is placed on a perforated metal sheet resting directly on the bed of the water-selective adsorption material.

7. Adsorption filter and desorption device according to claim 5 or 6, wherein the heat accumulator mass is a rock bed.

8. Adsorption filter and desorption device according to claim 5 or 6, wherein the heat accumulator mass is a quartz gravel bed with a grain size of 5/10 mm.

9. Adsorption filter and desorption device according to claim 5, wherein the bed of water-selective adsorption material has a volume of 15% to 35% of the volume of the body of adsorption material in the adsorption filter, and wherein the heat accumulator mass is about 0.5- to 3-times the mass in the bed of the water-selective adsorption material.

10. Adsorption filter and desorption device according to claim 9, wherein the bed of water-selective adsorption material has a volume of about 25%, and wherein the heat accumulator mass is about twice the mass in the bed of the water-selective adsorption material.

11. Adsorption filter and desorption device according to claim 1, wherein a condenser bypass is provided which shunts the condenser, said bypass equipped with a damper for shutting-off the bypass.

12. Adsorption filter and desorption device according to claim 1, wherein a reservoir bypass is provided which shunts the sorption water reservoir, said bypass equipped with a damper for closing the reservoir bypass.

13. Adsorption filter according to claim 1, wherein the sorption water reservoir with the heat accumulator mass and the packed bed of the water-selective adsorption material are arranged together with the condenser in a condenser housing.

14. Adsorption filter according to claim 13, wherein the condenser has its cooler part in the shape of a ring with vertically arranged cooling surfaces, and with the cooler having a central inflow into which inert gas containing desorbate flows, and wherein a vertically movable ring plate disposed in a gas collecting space with an inert gas outlet of the condenser housing covers the outflow side of the cooler when the ring plate is lowered blocking passage of the inflowing inert gas through the cooler, said ring plate having a central stub which when the ring plate is lifted blocks the direct flow of the inert gas into the gas collecting space and forces the inert gas to first flow up through the cooler, said ring plate in the lifted condition cooperates with an upper, and in the lowered condition with a lower ring flange, forming a seal.

\* \* \* \* \*